United States Patent
Feng et al.

(10) Patent No.: US 10,514,726 B2
(45) Date of Patent: Dec. 24, 2019

(54) MOBILE TERMINAL SENDING OUT SOUND VIA MULTIFUNCTIONAL BATTERY COVER AND METHOD THEREOF

(71) Applicant: JRD Communication Inc., Shenzhen (CN)

(72) Inventors: Siqin Feng, Shenzhen (CN); Zhihua Wu, Shenzhen (CN); Xiulu Jin, Shenzhen (CN); Linfang Li, Shenzhen (CN); Wenfei Wu, Shenzhen (CN)

(73) Assignee: JRD Communication Inc., Shenzhzen (CN)

( * ) Notice: Subject to any disclaimer, the term of this patent is extended or adjusted under 35 U.S.C. 154(b) by 0 days.

(21) Appl. No.: 16/344,903

(22) PCT Filed: Mar. 31, 2017

(86) PCT No.: PCT/CN2017/078956
§ 371 (c)(1),
(2) Date: Apr. 25, 2019

(87) PCT Pub. No.: WO2018/082250
PCT Pub. Date: May 11, 2018

(65) Prior Publication Data
US 2019/0258293 A1 Aug. 22, 2019

(30) Foreign Application Priority Data
Nov. 4, 2016 (CN) .......................... 2016 1 0961868

(51) Int. Cl.
*G06F 1/16* (2006.01)
*G06F 1/18* (2006.01)
*G06F 1/3234* (2019.01)
*H04R 1/02* (2006.01)
*H04R 5/04* (2006.01)
(Continued)

(52) U.S. Cl.
CPC .......... *G06F 1/1635* (2013.01); *G06F 1/1658* (2013.01); *G06F 1/1688* (2013.01); *G06F 1/188* (2013.01); *G06F 1/325* (2013.01); *H04R 1/023* (2013.01); *H04R 1/028* (2013.01); *H04R 3/00* (2013.01); *H04R 5/04* (2013.01); *H04R 1/2803* (2013.01); *H04R 5/02* (2013.01); *H04R 17/00* (2013.01); *H04R 2499/11* (2013.01)

(58) Field of Classification Search
CPC ... H04R 1/028; H04R 2499/11; G06F 1/1635; G06F 1/1658; G06F 1/1688; G06F 1/188; H01M 2/1066; H04M 1/0262; H04M 1/035
See application file for complete search history.

(56) References Cited

U.S. PATENT DOCUMENTS 6,859,538 B1 * 2/2005 Voltz ........................ H04R 3/04
 381/101
8,503,970 B1 * 8/2013 Uyehara ............. H04M 1/0262
 379/428.01

FOREIGN PATENT DOCUMENTS

CN 201904377 U 7/2011
CN 202488508 U 10/2012
(Continued)

*Primary Examiner* — Kile O Blair

(57) ABSTRACT

A mobile terminal that sends out sound via a multifunctional battery cover and a method thereof. The mobile terminal includes a processing module that identifies a battery cover including a piezoelectric ceramic speaker based on an ID signal output by the battery cover and outputs an audio signal to the piezoelectric ceramic speaker.

20 Claims, 3 Drawing Sheets

(51) Int. Cl.
*H04R 3/00* (2006.01)
*H04R 17/00* (2006.01)
*H04R 5/02* (2006.01)
*H04R 1/28* (2006.01)

(56) References Cited

FOREIGN PATENT DOCUMENTS

| | | |
|---|---|---|
| CN | 203104537 U | 7/2013 |
| CN | 203368743 U | 12/2013 |
| CN | 103686563 A | 3/2014 |
| CN | 204131572 U | 1/2015 |
| CN | 204633850 U  * | 9/2015 |

\* cited by examiner

MOBILE TERMINAL SENDING OUT SOUND VIA MULTIFUNCTIONAL BATTERY COVER AND METHOD THEREOF

FIELD OF THE INVENTION

The present invention relates to the field of audio technologies, and in particular to a mobile terminal that sends out sound via a multifunctional battery cover and a method thereof.

BACKGROUND

Currently, cell phones are designed to be increasingly thin with the entire thickness decreased from 12 to 15 mm in the past to 8 to 10 mm, or even less than 6 mm. As the entire thickness of cell phones becomes increasingly small, the space that can be used for design of speaker sound chamber is increasingly small as well. As a moving-coil speaker currently used by cell phones has a relatively large volume (with a thickness between 3 and 5 mm), it is not easy to install or fix the speaker in a limited space of the sound chamber. In addition, a moving-coil speaker has high requirements for the volume of a sound chamber. In the situation that a cell phone has a small space as a sound chamber, the performance of sending out sound is poor, and the quality of sound that is sent out is generally poor. The present invention proposes a design to improve the quality of sound sent out by a cell phone by using a multifunctional battery cover with an ultra-thin piezoelectric ceramic speaker. Therefore, the prior art still needs to be improved and developed.

SUMMARY OF THE INVENTION

In view of the above disadvantages of the prior art, the object of the present invention is to provide a mobile terminal that sends out sound via a multifunctional battery cover and a method thereof, which is intended to solve the problem of poor quality of sound sent out by existing thin mobile terminals. The above-discussed problems can be solved by the technical solution described below.

In an exemplary implementation, a mobile terminal that sends out sound via a multifunctional battery cover comprises: a processing module and a battery cover; the processing module acquires an identification (ID) signal of the battery cover and determines whether the battery cover is a multifunctional battery cover provided with a thin speaker; if yes, then activates the multifunctional battery cover to work when playing an audio, and outputs an audio signal to the multifunctional battery cover for playing.

In an exemplary implementation, the processing module comprises: a power supply unit configured to supply power to the battery cover by outputting a power supply voltage at startup; a determination unit configured to determine whether the acquired ID signal is a low-level signal; if yes, determine that the battery cover is a multifunctional battery cover provided with a thin speaker; otherwise, the battery cover is an existing regular battery cover, and output an interrupt signal of a corresponding level; a control unit configured to output an audio signal, and output corresponding activation signal.

In an exemplary implementation, the mobile terminal that sends out sound via a multifunctional battery cover, when the battery cover is a multifunctional battery cover, further comprises: a detection unit configured to perform ID detection at power-on for interrupt initiation and output an ID signal; an amplifier configured to turn on when receiving the activation signal and perform power amplification on the input audio signal; and a thin speaker configured to play the audio signal after power amplification.

In an exemplary implementation, the thin speaker is an ultra-thin piezoelectric ceramic speaker.

In an exemplary implementation, the sound chamber of the ultra-thin piezoelectric ceramic speaker has a front chamber height set to 0.3 mm and a rear chamber height set to greater than 0.1 mm and smaller than 0.45 mm.

In an exemplary implementation, the amplifier is a D-type amplifier or a G-type amplifier.

In an exemplary implementation, a resistor is provided between an output terminal of the D-type amplifier and the positive pole of the thin speaker.

In an exemplary implementation, method for sending out sound by using the mobile terminal that sends out sound via a multifunctional battery cover, comprises: Step A. The processing module acquires an ID signal of the battery cover and determines whether the battery cover is a multifunctional battery cover provided with a thin speaker; Step B. If yes, then the processing module activates the multifunctional battery cover to work when playing an audio, and outputs an audio signal to the multifunctional battery cover for playing.

In an exemplary implementation, Step A comprises: Step A1. At startup, the power supply unit supplies power to the battery cover by outputting a power supply voltage; Step A2. The detection unit performs ID detection at power-on for interrupt initiation and outputs an ID signal; Step A3. The determination unit determines whether the acquired ID signal is a low-level signal and outputs an interrupt signal of a corresponding level.

In an exemplary implementation, Step B comprises: Step B1. When the battery cover is a multifunctional battery cover provided with a thin speaker, the control unit outputs an audio signal and outputs an activation signal; Step B2. When receiving the activation signal, the amplifier is turned on, performs power amplification on the input audio signal, and then transmits the audio signal to the thin speaker for playing.

Compared with the prior art, an exemplary mobile terminal uses a processing module to acquire an ID signal of the battery cover and determine whether the battery cover is a multifunctional battery cover provided with a thin speaker and to activate the multifunctional battery cover to work when playing an audio, and output an audio signal to the multifunctional battery cover for playing. In this way, with respect to the problem that the sound chamber of a speaker of an existing mobile terminal has a small space and the quality of sound that is sent out is poor due to the thin design requirement, the quality of sound that is sent out by a cell phone can be improved by playing via a multifunctional battery cover. Moreover, a thin speaker is used in the multifunctional battery cover, which does not increase the thickness of a battery cover and meets the design requirement for a thin mobile terminal.

DETAILED DESCRIPTION

An exemplary mobile terminal that sends out sound via a multifunctional battery cover and a method thereof, which is applicable to a mobile terminal, such as a cell phone and a tablet computer, that has the thin design requirement. The quality of sound is improved by providing a multifunctional battery cover with a speaker. To make the objects, technical solutions and advantages of the present invention clearer and more specific, the present invention will be further described in detail below with reference to the accompanying drawings and embodiments. It should be understood that the specific embodiments described herein are used only to explain the present invention and are not used to limit the present invention.

Figure 1:
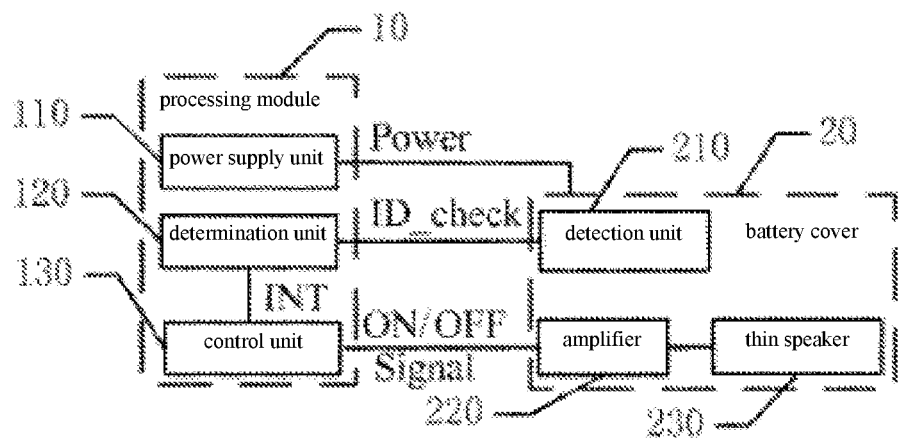
FIG. 1 is a structural block diagram of an exemplary mobile terminal that sends out sound via a multifunctional battery cover.

Referring to FIG. 1, an exemplary mobile terminal that sends out sound via a multifunctional battery cover includes a processing module 10 arranged on a printed circuit board (PCB) inside the mobile terminal and a battery cover 20 covering the back of the mobile terminal. At startup, the processing module 10 acquires an ID signal ID_check from the battery cover 20 and determines whether the battery cover 20 is a multifunctional battery cover provided with a thin speaker 230. If the battery cover 20 is the multifunctional battery cover provided with a thin speaker 230, then the processing module 10 activates the multifunctional battery cover to work when playing an audio, and outputs an audio signal to the multifunctional battery cover for playing. Alternatively, if the battery cover 20 is not provided with a thin speaker 230, then the processing module 10 transmits the audio signal to a speaker inside the mobile terminal for playing. In this way, with respect to the problem that the sound chamber of a speaker of an existing mobile terminal has a small space and the quality of sound that is sent out is poor due to the thin design requirement, the quality of sound that is sent out by a cell phone can be improved by playing via a multifunctional battery cover. Moreover, a thin speaker 230 is used in the multifunctional battery cover, which does not increase the thickness of the battery cover and meets the design requirement for a thin mobile terminal.

It should be understood that the PCB is provided inside the multifunctional battery cover. When the multifunctional battery cover covers the back of the mobile terminal, a port on the PCB is connected with a port on the circuit board of the mobile terminal. Therefore, data transmission can be performed between the mobile terminal and the multifunctional battery cover. A number of functional modules may be integrated on the PCB to acquire the information of the mobile terminal and achieve corresponding display functions, such as display of information like incoming call, time, battery power, etc. In an exemplary implementation, a thin speaker 230 is added to the PCB, which adds a playing function to the multifunctional battery cover and will not increase the thickness of the multifunctional battery cover.

In an exemplary implementation, the processing module 10 comprises a power supply unit 110, a determination unit 120, and a control unit 130. When the battery cover 20 is a multifunctional battery cover, the battery cover 20 comprises a PCB. A detection unit 210, an amplifier 220, and a thin speaker 230 are arranged on the PCB. The working principle of the processing module 10 and the battery cover 20 is as follows.

The power supply unit 110 is configured to supply power to the battery cover 20 by outputting a power supply voltage Power when the mobile terminal is turned on. If the battery cover 20 is an existing battery cover (that only has a cover with no circuit structure at all), then the power supply voltage Power will not be supplied to the battery cover 20, and no signal will be output to the processing module 10. If the battery cover 20 is the multifunctional battery cover, then the power supply voltage Power will be supplied to the battery cover 20. At power-on, the detection unit 210 performs ID detection for interrupt initiation and outputs an ID signal ID_check to the determination unit 120.

The determination unit 120 determines whether the ID signal ID_check is a low-level signal that indicates that the battery cover is a multifunctional battery cover provided with a thin speaker 230. If the determination unit 120 does not receive the ID signal ID_check, then the determination unit 120 determines that the battery cover is an existing regular battery cover without the thin speaker. The determination unit 120 outputs an interrupt signal INT of a corresponding level to the control unit 130. In an exemplary implementation, an ID detection pin of the determination unit 120 can be is pulled up to a high-level via a pull-up resistor. This can prevent interference by an external signal that causes misjudgment. Since a regular battery cover without the thin speaker does not feed a signal back to the ID detection pin, the determination unit 120 interprets the lack of the ID signal ID_check has receiving an ID signal ID_check having a high level on the ID detection pin, which pulls the ID detection pin to a high-level, and then it is determined to be a battery cover without a thin speaker. On the other hand, a multifunctional battery cover would output a low-level ID signal ID_check to the determination unit 120, which is equivalent to pulling down the ID detection pin and it is determined to be a multifunctional battery cover. It is usually only necessary to determine the type of a battery cover at startup. If a battery cover is replaced, it has to be done with the mobile terminal shut down, and then determination can be performed at startup again. In a situation that the ID detection pin is pulled up as a battery cover falls off or due to bad connection, the determination unit 120 can constantly determine whether the ID signal is a low-level signal and output an interrupt signal INT of a corresponding level.

The control unit 130 turns on or shuts down the amplifier 220 according to a high or low level of the interrupt signal INT. If the ID signal ID_check is a low-level signal, then the interrupt signal INT is also a low-level signal (valid). At this time, the control unit 130 marks that a multifunctional battery cover is currently connected. When an audio (e.g. music, recording, radio, etc.) needs to be played, the control unit 130 outputs an activation signal ON to turn on the amplifier 220, outputs an audio signal Signal into the amplifier 220 for power amplification, which is then played via the thin speaker 230. In this way, other functions of the multifunctional battery cover are not affected, while the audio is sent out and the sound quality is improved.

Similarly, when the lack of an ID signal ID_check is interpreted as the determination unit 120 as receiving a high-level signal, the control unit 130 outputs an audio signal Signal to a speaker inside the mobile terminal for playing.

According to the demand for thin design of existing mobile terminals and to provide a better effect of sound sent out, an exemplary thin speaker is an ultra-thin piezoelectric ceramic speaker.

Figure 2:
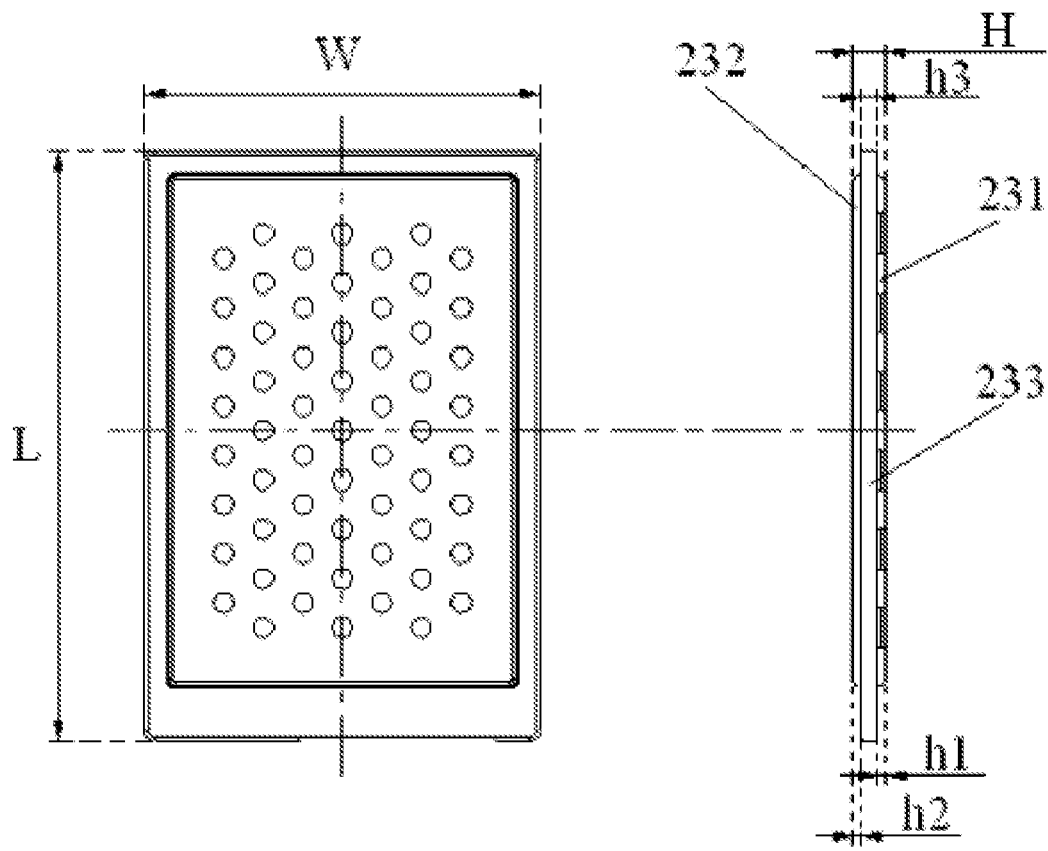
FIG. 2 is a plan view and a side view of an exemplary ultra-thin piezoelectric ceramic used with a multifunctional battery cover speaker.

Referring to FIG. 2, an exemplary ultra-thin piezoelectric ceramic speaker has a simple structure and an ultra-thin appearance (with the thickness at about 1 to about 2 mm). An ultra-thin piezoelectric ceramic speaker typically has a body thickness less than about 2 mm, a compact package, low requirements for the volume of a sound chamber, and high electro-acoustic transformation efficiency and sound pressure level (SPL), which is very suitable for a multifunctional battery cover and achieve ultra-thin applications. As shown in FIG. 2 (unit: mm), the ultra-thin piezoelectric ceramic speaker has an overall thickness H of about 1.75 mm (error±0.2), which is very thin, and it does not have a large horizontal area, which is only 20 (W)×30 (L) mm and the error for W and L is ±0.2. The thickness h1 of the front speaker cover 231 is about 0.6 mm, the thickness h2 of the rear speaker cover 232 is about 0.4 mm, and the thickness h3 of the speaker body 233 is about 0.75 mm.

The dimensions of the ultra-thin piezoelectric ceramic speaker can improve the speaker sound chamber of a multifunctional battery cover.

Figure 3:
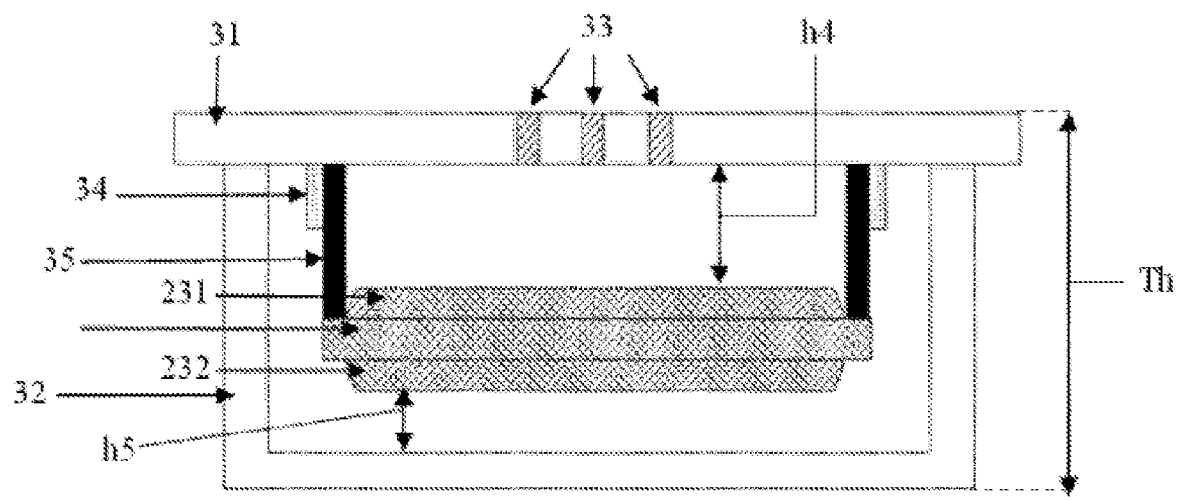
FIG. 3 is a cross-sectional view of a speaker sound chamber of an exemplary ultra-thin piezoelectric ceramic speaker used with a multifunctional battery cover.

As shown in FIG. 3, the speaker sound chamber comprises a speaker installation face shell 31, a face shell 32, and a sound outlet 33 formed in the center of the speaker installation face shell 31. The face shell 32 is provided with two positioning surrounding ribs 34 and two rubber rings 35 that are fixed on two ends of the speaker installation face shell 31 and an ultra-thin piezoelectric ceramic speaker therein. The exemplary sound chamber has a reduced height, as compared to a conventional sound chamber. Where the front chamber height h4 (i.e. the distance from the front speaker cover 231 to the inner side of the speaker installation face shell 31) may be set to about 0.3 mm, the rear chamber height h5 (i.e. the distance from the rear speaker cover 232 to the inner side of the face shell 32) just needs to be greater than about 0.1 mm and smaller than about 0.45 mm. The body thickness of the ultra-thin piezoelectric ceramic speaker (<2 mm), the overall installation height Th may be smaller than about 2.5 mm, which meets the assembly requirements for a thin multifunctional battery cover of a cell phone.

Unlike a moving-coil speaker inside a mobile terminal, an ultra-thin piezoelectric ceramic speaker is a capacitive load, and reactive power consumed on by ultra-thin piezoelectric ceramic speaker is much lower than that on a moving-coil speaker. Therefore, the electro-acoustic transformation efficiency of an ultra-thin piezoelectric ceramic speaker is higher than that of a moving-coil speaker. The power consumption of a moving-coil speaker at 90 dB sound pressure is typically 120 mW, but under the same conditions, it is only 15 mW for an ultra-thin piezoelectric ceramic speaker.

Figure 4:
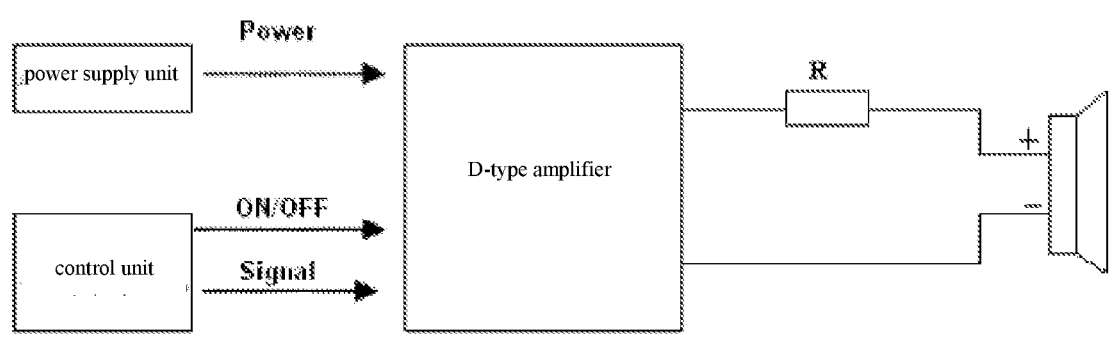
FIG. 4 is a circuit diagram of an amplifier and a thin speaker in an exemplary multifunctional battery cover.

However, an ultra-thin piezoelectric ceramic speaker has relatively strict requirements for amplifiers and requires that an amplifier can drive a high capacitive load, output a higher current under a higher frequency, and at the same time, maintain a high output voltage. Therefore, the amplifier in an exemplary implementation can be a D-type amplifier or a G-type amplifier. As shown in FIG. 4, when the power supply voltage Power is 3.6 V, a D-type amplifier (e.g., Model No. PAM8902) can drive an ultra-thin piezoelectric ceramic speaker as high as 30 Vpp (i.e. 10.6 Vrms, and the effective voltage is 10.6 V). The current output can reach up to 1 A, which is very suitable for driving an ultra-thin piezoelectric ceramic speaker (shown by the speaker icon at the rightmost side in the figure). When the input signal has a high frequency, the ultra-thin piezoelectric ceramic speaker has a low resistance, and the output current will be significantly increased. Therefore, it is necessary to add a resistor R between an output terminal of the D-type amplifier and the positive pole of the ultra-thin piezoelectric ceramic speaker to limit the current, so as to prevent the amplifier from entering a current-limiting mode.

Figure 5:
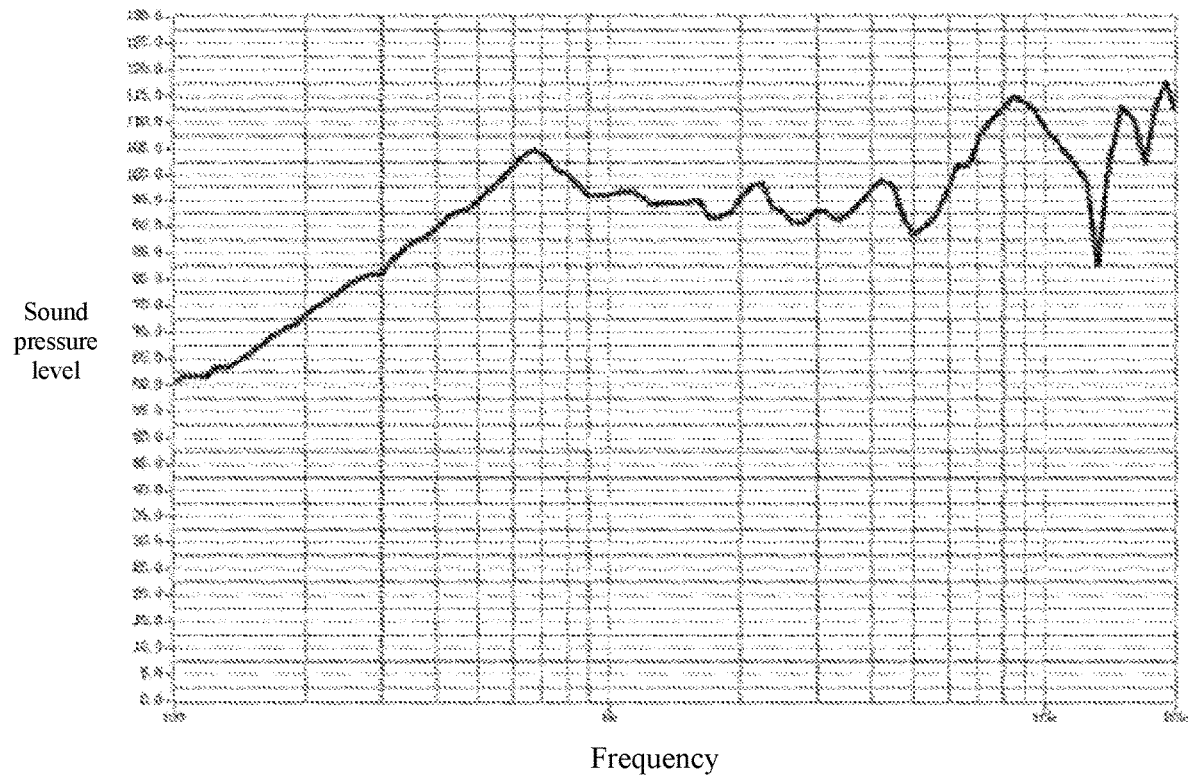
FIG. 5 is a frequency response waveform diagram of an exemplary ultra-thin piezoelectric ceramic speaker used with a multifunctional battery cover, the unit of Frequency is Hz, the unit of Sound pressure level is dB.

FIG. 5 is a frequency response waveform diagram of an ultra-thin piezoelectric ceramic speaker. As driven by, for example, the D-type amplifier (Model No. PAM8902), when the output is 5 Vrms (the effective voltage is 5 V), the sound pressure level (SPL) of 1 Khz frequency at a testing distance of 5 cm is about 97 dB, which achieves a good sensitivity.

In an exemplary implementation, an ultra-thin piezoelectric ceramic speaker may be combined with a single moving-coil speaker inside a mobile terminal to expand to a stereo application. Namely, when the control unit 130 marks that a multifunctional battery cover is currently connected, an activation signal ON is output to turn on the amplifier. When an audio needs to be played, an audio signal Signal is output and played simultaneously by the multifunctional battery cover and the speaker inside the mobile terminal, thereby achieving stereo.

Figure 6:
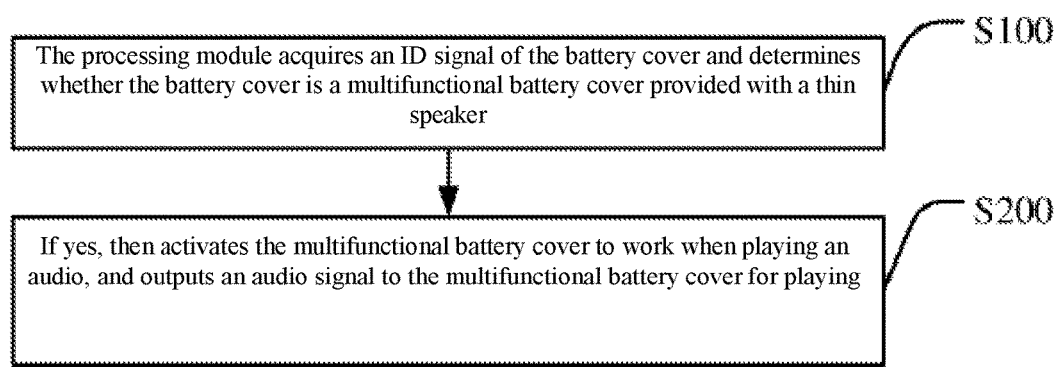
FIG. 6 is a flow chart showing an exemplary method of operating a multifunctional battery cover for sending out sound using an ultra-thin piezoelectric ceramic speaker.

FIG. 6 is a flow chart showing an exemplary method of operating a multifunctional battery cover for sending out sound using a multifunctional battery cover having an ultra-thin piezoelectric ceramic speaker.

Step S100. The processing module 10 acquires an ID signal of the battery cover 20 and determines whether the battery cover 20 is a multifunctional battery cover provided with a thin speaker 230.

Step S100 further includes sub-steps S110, S120, and S130, as described below.

Step S110. At startup, the power supply unit 110 supplies power to the battery cover 20 by outputting a power supply voltage Power.

Step S120. The detection unit 210 performs ID detection at power-on for interrupt initiation and outputs an ID signal ID_check.

Step S130. The determination unit 120 determines whether the acquired ID signal ID_check is a low-level signal. If so, then the determination unit 120 determines that the battery cover 20 is a multifunctional battery cover provided with a thin speaker 230. Alternatively, if the determination unit 120 does not receive the ID signal ID_check, then the determination unit 120 interprets the lack of the ID signal ID_check to be the same as receiving an ID signal ID_check having a high level and determines that the battery cover 20 is an existing regular battery cover without a speaker, and outputs an interrupt signal of a corresponding level. When the ID signal ID_check has a low value, the interrupt signal is low.

Step S200. If the determination unit 120 determines that the battery cover 20 is a multifunctional battery cover, then the processing module 10 activates the multifunctional battery cover to work when playing an audio, and outputs an audio signal to the multifunctional battery cover for playing.

Step S200 includes sub-steps S210 and S220, as discussed below.

Step 210. When the battery cover is a multifunctional battery cover provided with a thin speaker 230, the control unit 130 outputs an audio signal and outputs an activation signal ON.

Step 220. When receiving the activation signal ON, the amplifier 220 is turned on, performs power amplification on the input audio signal, and then transmits the audio signal to the thin speaker 230 for playing.

In summary, the exemplary multifunctional battery cover plays an audio signal by using an ultra-thin piezoelectric ceramic speaker, which does not increase the thickness of the multifunctional battery cover and meets the design requirement for a thin mobile terminal. Moreover; moreover, an ultra-thin piezoelectric ceramic speaker has an electro-acoustic transformation efficiency higher than that of a moving-coil speaker, very low reactive power, and good sensitivity. The implementation of the multifunctional battery cover application on a cell phone can greatly improve the quality of sound that is sent out; as a result, it solves the problem that the sound chamber of a speaker of an existing mobile terminal has a small space and the quality of sound that is sent out is poor due to the thin design requirement.

It should be understood that applications of the exemplary implementations are not limited to the examples above. To a person skilled in the art, the exemplary implementations may be improved or modified, and all these improvements and modifications shall be encompassed by the appended claims.

What is claimed is:

1. A mobile terminal, comprising:
    a battery cover that attaches to the mobile terminal; and
    a processing module configured to:
        determine whether the battery cover includes a speaker based on an identification (ID) signal from the battery cover, wherein
        if the battery cover is determined to include the speaker, then the processing module is further configured to:
            activate the battery cover, and
            output an audio signal from the processing module to the speaker.

2. The mobile terminal according to claim 1, wherein the processing module comprises:
    a power supply unit configured to supply power to the battery cover by outputting a power supply voltage at a start-up of the mobile device;
    a determination unit configured to:
        determine that the battery cover includes the speaker based on the ID signal, and output an interrupt signal having a low-level, or
        determine that the battery cover does not include the speaker based on a lack of the ID signal; and output an interrupt signal having a high level
    a control unit configured to:
        output, based on the interrupt signal having the low-level, an activation signal to the battery cover and an audio signal to the speaker.

3. The mobile terminal according to claim 2, wherein, when the battery cover includes the speaker, the battery cover further comprises:
    a detection unit configured to output the ID signal to the processing module; and
    an amplifier configured to:
        turn on in response to the activation signal, and
        receive the audio signal from the processor and output an amplified audio signal to the speaker
        the shutdown signal.

4. The mobile terminal according to claim 3, wherein the amplifier is a D-type amplifier or a G-type amplifier.

5. The mobile terminal according to claim 3, further comprising:
    a resistor located between between an output terminal of the amplifier and a positive pole of the speaker.

6. The mobile terminal according to claim 1, wherein the speaker is a piezoelectric ceramic speaker having a thickness of less than about 2 mm.

7. The mobile terminal according to claim 6, wherein a sound chamber of the piezoelectric ceramic speaker has a front chamber height of about 0.3 mm and a rear chamber height of about 0.1 mm to about 0.45 mm.

8. A method, comprising:
    determining, via a processing module of a mobile terminal, whether a battery cover attached to the mobile terminal includes a speaker based on the processing module receiving an identification (ID) signal from the battery;
    activating, via the processing module, the battery cover when the processing module determines that the battery cover includes the speaker; and
    sending, via the processing module, an audio signal to the speaker.

9. The method according to claim 8, wherein the determining whether the battery cover attached to the mobile terminal includes the speaker further comprises:
    supplying, via a power supply unit of the mobile device, a power supply voltage to the battery cover at a start-up of the mobile device;
    receiving, via the determination unit of the mobile device, the ID signal from a detection unit of the battery cover; and
    outputting, via the determination unit, an interrupt signal having a low-level to a control unit of the mobile device, if the determination receives the ID signal indicating a presence of the speaker.

10. The method according to claim 9, wherein the activating the battery cover and the sending the audio signal to the speaker further comprises:
    outputting, via the control unit of the mobile device, and based on the interrupt signal having the low-level, the audio signal to the speaker, and outputting an activation signal to turn on an amplifier of the battery cover to amplify the audio signal to the speaker.

11. The method according to claim 8, wherein the thin speaker is a piezoelectric ceramic speaker having a thickness of less than about 2 mm.

12. The method according to claim 11, wherein a sound chamber of the piezoelectric ceramic speaker has a front chamber height of about 0.3 mm and a rear chamber height of about 0.1 mm to about 0.45 mm.

13. The method according to claim 8, wherein the activating the battery cover further comprises:
    activating a D-type amplifier or a G-type amplifier of the battery cover.

14. The method according to claim 13, wherein the sending an audio signal to the speaker further comprises:
    sending the audio signal from the D-type amplifier or the G-type amplifier through a resistor to a positive pole of the speaker.

15. A battery cover for attaching to a mobile device, the battery cover comprising:
    a speaker in electrical communication with a processing module of the mobile device, the speaker to output an audio signal from the mobile device;

an amplifier connected to the speaker to amplify the audio signal; and a detection unit in electrical communication with the processing module, the detection unit to output, to the processing module, a signal identifying the battery cover as including the speaker to cause the processing module to output the audio signal to the speaker and to output a signal to turn on the amplifier.

16. The battery cover according to claim 15, wherein the speaker is a piezoelectric ceramic speaker having a front chamber height of about 0.3 mm and a rear chamber height of about 0.1 mm to about 0.45 mm.

17. The battery cover according to claim 15, wherein the amplifier is a D-type amplifier or a G-type amplifier.

18. The battery cover according to claim 15, further comprising:

a resistor located between the amplifier and the positive pole of the speaker.

19. The battery cover according to claim 15, wherein the detection unit is in electrical connection with a power supply unit of the mobile terminal to receive a power supply voltage at a start-up of the mobile terminal to cause the detection unit to output the signal identifying the battery cover as including the speaker.

20. The battery cover according to claim 15, wherein the amplifier, the detection unit, and the speaker are formed on a printed circuit board of the battery cover.

\* \* \* \* \*